(12) United States Patent
Widmer

(10) Patent No.: US 6,753,484 B1
(45) Date of Patent: Jun. 22, 2004

(54) UNDER-TRANSPORTER SHIELD FOR A WEIGHING MACHINE

(75) Inventor: Hans Peter Widmer, Hadsten (DK)

(73) Assignee: Bilwinco A/S, Skanderborg (DK)

( * ) Notice: Subject to any disclaimer, the term of this patent is extended or adjusted under 35 U.S.C. 154(b) by 0 days.

(21) Appl. No.: 09/980,958

(22) PCT Filed: May 2, 2000

(86) PCT No.: PCT/DK00/00220
§ 371 (c)(1),
(2), (4) Date: Oct. 26, 2001

(87) PCT Pub. No.: WO00/66983
PCT Pub. Date: Nov. 9, 2000

(30) Foreign Application Priority Data

May 3, 1999 (DK) .................................... 1999 00599

(51) Int. Cl.[7] ............................................. G01G 19/387
(52) U.S. Cl. ................... 177/25.18; 177/180; 177/238; 177/243
(58) Field of Search ............................ 177/25.18, 103, 177/238, 243, 180

(56) References Cited

U.S. PATENT DOCUMENTS

| | | | |
|---|---|---|---|
| 4,171,067 A | 10/1979 | Faulkner et al. ................ 222/1 |
| 4,545,630 A | 10/1985 | Izumi et al. ................... 312/285 |
| 4,606,475 A | 8/1986 | Usagawa ....................... 222/58 |
| 4,683,966 A | 8/1987 | Nakagawa et al. ............. 177/25 |
| 4,812,701 A | * 3/1989 | Izumi ....................... 177/25.18 |
| 4,977,968 A | * 12/1990 | Krämer .................... 177/25.18 |
| 5,038,875 A | 8/1991 | Kitagawa et al. ......... 177/25.18 |
| 5,613,590 A | 3/1997 | Simionato ................... 198/358 |
| 5,621,194 A | * 4/1997 | Koyama et al. ......... 177/25.18 |
| 5,753,867 A | * 5/1998 | Konishi et al. .......... 177/25.18 |
| 6,188,029 B1 | * 2/2001 | Miyamoto et al. ....... 177/25.18 |

FOREIGN PATENT DOCUMENTS

| | | |
|---|---|---|
| EP | 0615114 | 9/1994 |
| JP | 06317456 | 11/1994 |
| JP | 08219859 | 8/1996 |

OTHER PUBLICATIONS

Patent abstracts of Japan 06317456 Filed: Nov. 15, 1994.
Patent abstracts of Japan 08219859 Filed Aug. 30, 1996.

* cited by examiner

Primary Examiner—Randy W. Gibson
(74) Attorney, Agent, or Firm—Ladas & Parry

(57) ABSTRACT

A weighing machine for weighing off batches of material, said weighing machine comprising a frame on which a central distributor, a plurality of transporters and a plurality of scales are mounted, and wherein the transporters are arranged around the central distributor and configured with a view to transporting material from the distributor and radially outwards from the central distributor and to the scales, and wherein the weighing machine comprises one or more substantially uninterrupted shields in the form of screen faces that extend from a point underneath the distributor and outwards and downwards underneath at least that end of the transporters that faces towards the central distributor in the operative position of the machine.

13 Claims, 3 Drawing Sheets

UNDER-TRANSPORTER SHIELD FOR A WEIGHING MACHINE

The present invention relates to weighing machines for weighing off batches of material, said weighing machines comprising a steel construction on which a central distributor, a plurality of transporters and a plurality of scales are mounted, and wherein the transporters are arranged around the central distributor and configured with a view to transporting material from the distributor and radially outwards from the central distributor and to the scales.

Today such weighing machines are used essentially for forming batches of bulk material of a weight that is very close to a desired reference weight such that the batches can be transferred to e.g. a packaging machine that packages the individual batches.

Such weighing machines that are often designated combination weights operate in that each of the scales are, by means of the transporters, filled with a batch portion of the bulk material that was initially supplied to the central distributor and then, via the central distributor, transferred to the individual transporters. The individual batch portion is subsequently weighed off the bulk product into the individual scales, and by means of a calculator or computer the scales are found that combine to contain a bulk product that is close to the desired reference weight. Finally the calculator is configured to effect that the thus identified scales are emptied to form the total batch of the bulk product, and since it is possible to continuously form and identify combinations of scales that combine to contain the desired amount, such machines enable very elevated production rates while generating a large number of material batches exhibiting very small variations in their weight.

However, it is a problem in connection with the prior art machines to be used for this purpose that it is necessary to configure the central distributor as well as the individual transporters such that there is a certain amount of clearance there between, and since there is often a considerable amount of the bulk material present in these parts of the machine, practice has shown that it is difficult to avoid that material, be it individual loose objects or fluid, passes through the clearances present between the central distributor and the transporters, and between the transporters as such.

Thus, in case of the prior art machinery it is often necessary to perform regular cleaning of the machine, such material constituents being susceptible to deposit on the frame parts of the machine with for instance an ensuing sanitary hazard.

In the light of this it is the object of the present invention to provide a weighing machine of the kind described above whereby such sanitary hazards have been completely or partially overcome.

According to the invention this is obtained in that the weighing machine comprises one or more substantially uninterrupted shields in the form of screen faces that extend from somewhere underneath the distributor and outwards and downwards below at least that end of the transporter that faces towards the central distributor, seen in the operative position of the machine.

According to a preferred embodiment of the invention the transporters of the weighing machine is configured such that they comprise a groove with a first end that faces towards the central distributor and a second, open end that faces towards one or more scales; and wherein the groove is delimited by two lateral edges that extend between the first and the second open ends.

The screen faces in the weighing machine can preferably comprise frustoconical or upwardly convex, rounded faces that can be configured from a plate material in a simple manner.

To this end, the screen faces may advantageously comprise cylindrical faces that extend from a frustoconical face and downwards from the lower edge thereof whereby, the screen face can be configured such that its distance from the central distributor, the transporters and for instance scales can be adapted in such a manner that material that drops onto the screen face does not drop too rapidly.

Particularly advantageously a collector groove is configured at the lower edge of the screen faces with a view to collecting material that drops from the distributor or the transporters, and that will—via the screen faces—be conveyed down into the collector groove. Hereby cleaning of the machine, if to be performed, is enabled with liquids without the liquids continuing down into a subjacent packing machine, if any, and that for instance liquids from the bulk material portioned in the machine and that run down through the clearances, e.g. between the individual transporters and the central distributor, do not drip into the packaging machine or the packagings.

In this context the collector grooves advantageously features an outlet in particular for liquids that are collected in the collector groove.

According to a further preferred embodiment of the invention the screen faces constitute a part of the weighing machine's frame construction, and the central distributor, the transporters and/or the scales are mounted on the screen face by means of fittings intended therefor. Hereby it is possible—with the screen faces—to construct an extremely vibration-free shell construction that will support the individual constituents that are mounted thereon in a stable manner.

To this end the fittings can advantageously be configured such that they permit material that runs or slides down the screen face to run or slide past the fitting, an in accordance with a particularly simple embodiment of the fittings, they comprise substantially planar plate flanges that are secured to the screen face in such a manner that the plane of the plate flange extends substantially vertically or slantingly downwards.

Advantageously, the weighing machine comprises a computer ia for collecting weighing data from the scales and for controlling the transporters; and wherein at least a part of the weighing machine computer is arranged below the screen face thereby avoiding a considerable amount of wirings from an external computer and which also means that the computer is still well shielded against soiling and humidity.

Further advantageously a number of liquid nozzles can be configured above the screen face, said nozzles being connected to a conduit for liquids with a view to sweeping and cleaning the screen face with cleaning liquid. This enables extremely simple cleaning of the machine when necessary.

According to an embodiment that is particularly suitable for portioning material that consists of solid components the screen face can extend substantially uninterrupted from a point underneath the central distributor and out underneath the other end of the grooves. This is due to the fact that primarily the solid components, have a tendency to travel out between the spaces that are located between the individual transporters and the screen face will thereby effectively catch such solid components.

The invention will now be described in further detail in with reference to the drawings, wherein FIG. 1 is a principle sketch that outlines, in a sectional view through the centre axis of the machine, a weighing machine according to the invention, seen from the side;

Figure 1:
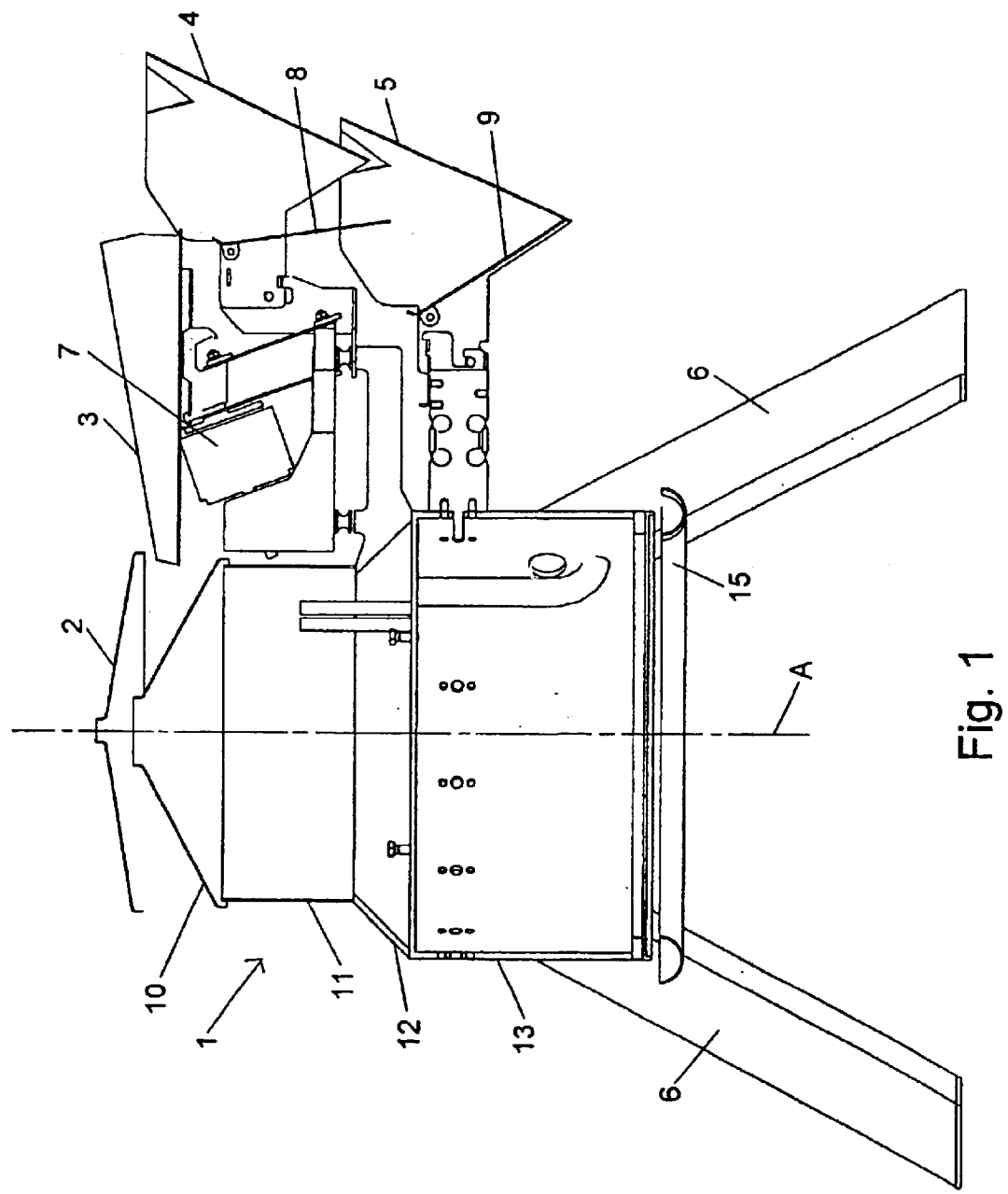
Figure 2:
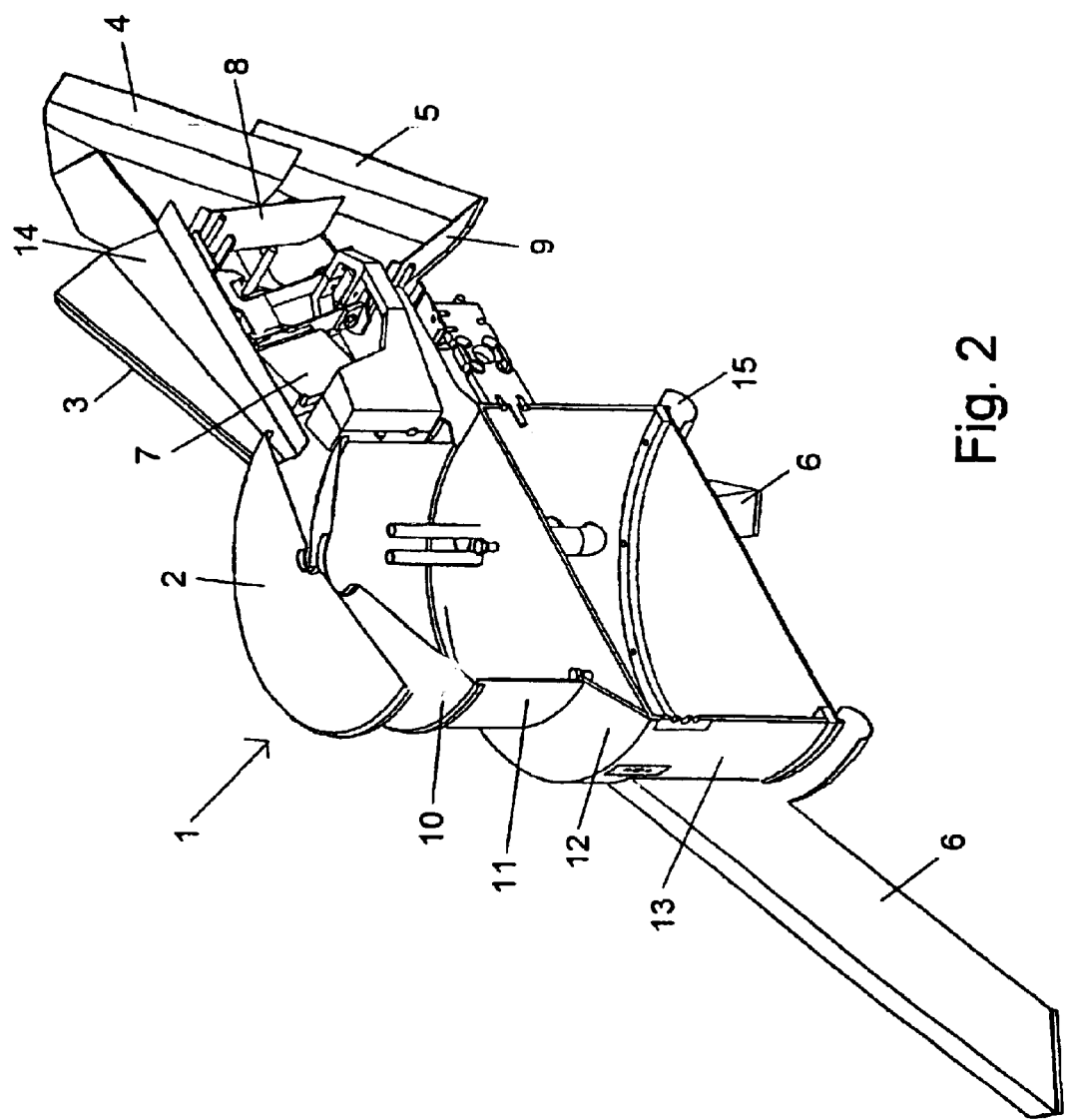
FIG. 2 is a perspective sectional view that shows the weighing machine shown in FIG. 1 in an inclined top plan view in the vertical sectional plane through the centre axis of the machine.

Thus, FIGS. 1 and 2 illustrate a weighing machine 1, said weighing machine 1 comprising—like the commonly known weighing machines for combination weighing material—a central distributor 2, an number of transporters 3 provided with grooves 14, a number of portioning dishes 4 and a corresponding number of scales 5. For the sake of clarity the drawing shows only one transporter 3, one portioning dish 4 and one scale, but—as is commonly known within the field of combination weighing machines—a fully mounted weighing machine comprises a plurality of such that are arranged peripherally and circularly around the central distributor. Thus the machine is constructed essentially symmetrically about its centre axis A and as shown it comprises a number of legs 6 that support the frame of the machine.

The functioning of the weighing machine 1 is such that an amount of the bulk material to be portioned is deposited on the central distributor 2. This could comprise appliances such as nails, screws, nuts, etc, or they may be foodstuffs, such as candies, wine gums, fish or cheese.

By means of the central distributor 2 the bulk material is distributed to the individual transporters 3. This can be accomplished by the bulk material sliding on the central distributor, but very often special means are used to ensure this distributor, such as a vibrator (not shown in the drawing) that is configured for imparting to the central distributor a spiral movement about the central axis A of the weighing machine.

When the bulk material from the central distributor 2 reaches each of the transporters they will, by means of e.g. a linear vibration motor 7, ensure that the bulk material is moved outwards towards the peripherally arranged portioning dishes 4 that are filled at least partially with a portion of the bulk material. Since each of the portioning dishes 4 is provided with an activatable flap 8, this portion of the bulk material can be transferred to the scale 5 that is located underneath the portioning dish 4, said scale being provided with (not shown) means for weighing the transferred portion; and wherein the bottom of the scale 5 is configured with an activatable flap 9 whereby the scale can be emptied.

Since there are several such transporters, portioning dishes and scales it is thus clear that the above-mentioned functionality can, by means of convenient control—for instance computer aided—carry out repeated weighing and discharge operations of individual portions of the bulk material, and by combination of two or more of the portions, portions exhibiting very small variations relative to a desired wright can be obtained.

According to the invention the machine shown in FIG. 1 is provided with a shield 10,11,12,13, said shield comprising an upper frustoconical face 10 that extends, at its lower end, into an upper circular cylindrical face 11 that yet again, at its lower end, extends into a further lower frustoconical face 12 that finally extends into a lower circular cylindrical face 13 on which the legs 6 of the machine are mounted.

In this manner it is ensured that liquids, if any, that are emitted from the bulk material on the weighing machine during the weighing procedure and that optionally collects in the grooves 14 of the transporters 3 and run towards the centre axis A of the weighing machine will proceed down onto the upper frustoconical face 10 and then down the shield 10,11,12,13 such that it is readily ensured that the liquid is collected and does not continue into the (not shown) packing machine that is optionally arranged underneath the weighing machine 1.

Preferably such collection of the liquids is, according to the embodiment shown in FIGS. 1 and 2, established by means of a collector groove 15 wherein there is optionally mounted an outlet stub for ready emptying the collector groove 15, if necessary.

The weighing machine shown in FIGS. 1 and 2 is particularly suitable for weighing off products or bulk material wherein liquid is discharged, or where dust or the like is emitted that can be humidified by the atmospheric air and thus form a liquid substance. Since a liquid that is optionally discharged will primarily collect at the bottom of the groove, the liquid will either run towards the portioning dishes and very likely be included in the weighing process, or else it will run towards the centre axis A and collect as explained above.

Since it is a rare occurrence in itself that the liquid will drip from the lateral edges on the grooves 14 in the transporters it is not necessary to provide a shield that covers underneath the entire length of the transporters.

Figure 3:
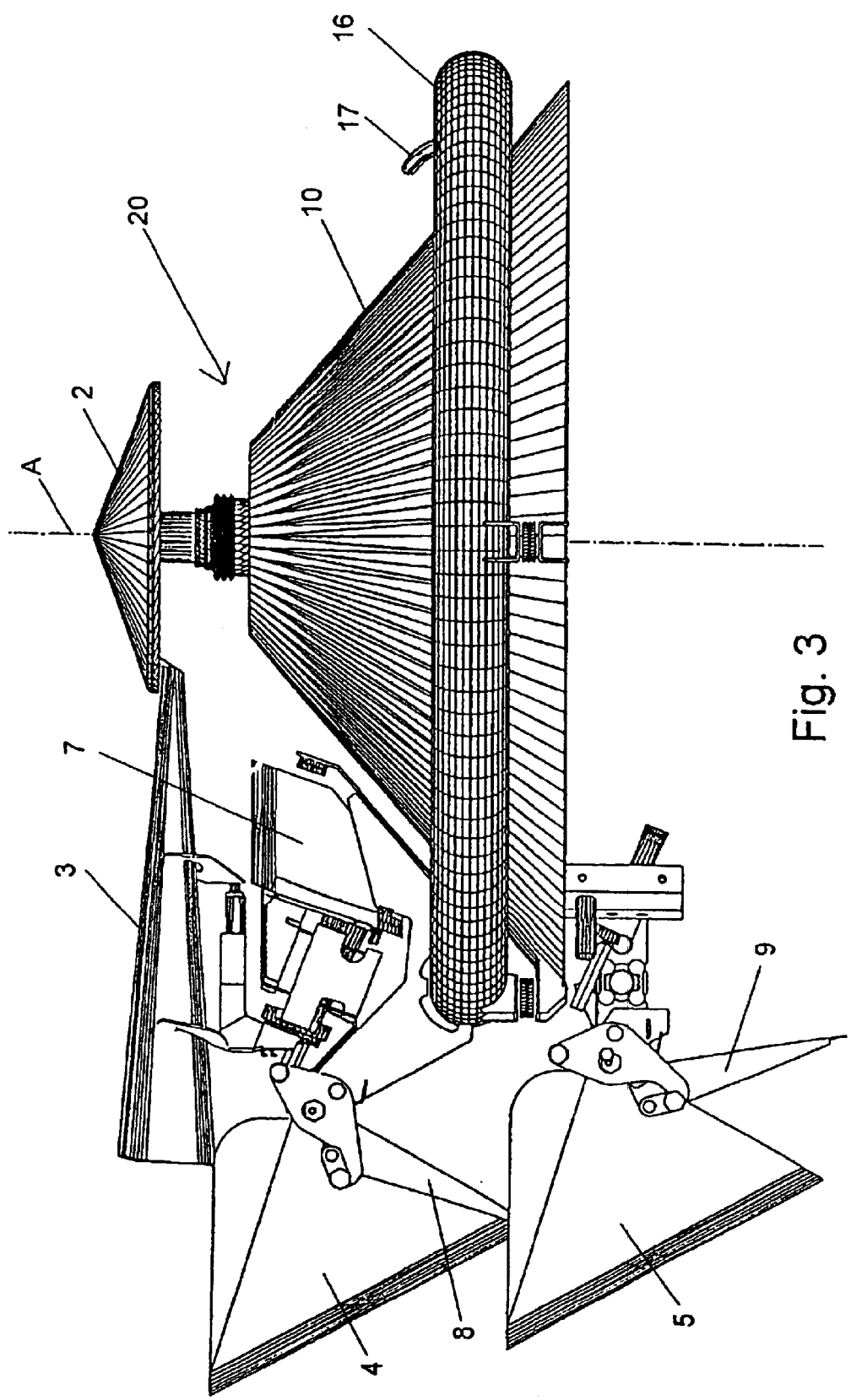
FIG. 3 is a principle sketch that illustrates an alternative embodiment of the invention, seen from the side.

Then, FIG. 3 illustrates an alternative embodiment of a weighing machine according to the invention that is particularly suitable for weighing bulk material that consists of relatively small, hard individual components. As will appear the weighing machine 20 shown in FIG. 3 is constructed in accordance with the same principles as the weighing machine shown in FIGS. 1 and 2 and the constituents of this machine are thus shown with the same reference numerals as the machine shown in FIG. 1 and 2 and thus no further explanation of the functionality of the machine will be given here.

The embodiment shown in FIG. 3, however, is particular in that the shield 10 extends underneath a considerable part of the length of the transporters 3 thereby enabling the shield 10 to collect individual components, if any, that drop between the transporters 3. Thus the substantially frustoconical shield 10 forms a chute that ensures that there is only a very small risk of the individual components remaining on the frame of the weighing machine or any other constituents.

As will appear, a convenient embodiment of the invention provides a frame portion 16 that extends across the shield 10 at a distance there from and thereby permits individual components from the bulk material to slide underneath the frame portion 16. As shown this frame portion can be configured as an annular tube and thereby it is also possible, as shown, to arrange a number of spray nozzles 17 that can, via the tube, be supplied with pressurized cleaning liquid thereby enabling simple cleaning of the shield 10 by sweeping thereof.

Besides, the embodiment of the invention shown in FIG. 3 distinguishes itself from the one shown in FIGS. 1 and 2 in that a collector groove is not provided at the lower edge of the shield, which means that constituents, if any, from the bulk material is not collected therein and removed, but that such constituents will be conveyed down into the packing machine and be included in a batch that has already been weighed, and in this context a not shown chute can conveniently be configured that conveys the individual components down into one of the scales such that these components are still included in the weighed-off portion.

As will appear from the figures, the shield 10,11,12 and 13 will form a space below them wherein, according to a preferred embodiment, major constituents for the machine can be arranged, such as control unit or computer optionally configured for activating the transporters 3, the flaps 8 and 9 of the portioning dishes 4 and the scales, and optionally for carrying out the requisite combination calculations that are carried out in such combination weighing machines. Hereby it is possible to avoid a large number of the cablings and wirings and the cleaning problems associated therewith that are conventionally encountered in connection with conventional combination weighing machines as a consequence of their having a separate computing unit located a distance from the weighing machine as such.

Obviously the fundamental principle of the present invention is useful in other embodiments of combination weighing than the ones shown in FIGS. 1, 2 and 3.

What is claimed is:

1. A weighing machine for weighing batches of material, said weighing machine comprising
    a frame portion on which a central distributor, a plurality of transporters and a plurality of scales are mounted, wherein the transporters are arranged around the central distributor for transporting material radially outwards from the central distributor to the scales and
    one or more substantially uninterrupted shields that all extend downwards underneath the transporters in an operative position of the weighing machine.

2. A weighing machine according to claim 1, characterised in that the uninterrupted shield extends from a point underneath the distributor and outwards and downwards underneath at least that end of the transporters that faces towards the central distributor in the operative position of the machine.

3. A weighing machine according to claim 1, characterised in that each of the transporters comprises a groove with a first end that faces towards the central distributor and another open end that faces towards one or more scales, and wherein the groove is delimited by two lateral edges that extend between the first and the second open end.

4. A weighing machine for weighing batches of material, said weighing machine comprising
    a frame portion on which a central distributor, a plurality of transporters and a plurality of scales are mounted, wherein the transporters are arranged around the central distributor and configured with a view to transporting material from the distributor and radially outwards from the central distributor and to the scales, characterized in that the weighing machine comprises one or more substantially uniterrupted shields in the form of screen faces that extend outwards and downwards underneath the transporters in an operative position of the weighing machine,
    characterised in that the screen faces comprise frustoconical faces that are made of a plate material, and that at the bottom the screen faces end in a relatively sharp edge with a view to forming a drop catcher for liquid, if any, that runs down the screen faces.

5. A weighing machine according to claim 4, characterised in that the screen faces further comprise cylindrical faces that extend from a frustoconical face and downwards from its lowermost edge.

6. A weighing machine for weighing batches of material, said weighing machine comprising
    a frame portion on which a central distributor, a plurality of transporters and a plurality of scales are mounted, wherein the transporters are arranged around the central distributor and configured with a view to transporting material from the distributor and radially outwards from the central distributor and to the scales, characterized in that the weighing machine comprises one or more substantially uninterrupted shields in the form of screen faces that extend outwards and downwards underneath the transporters in an operative position of the weighing machine,
    characterised in that, at the lowermost edge of the screen faces, a collector groove or a collector tray is configured with a view to collecting material that drops from the distributor or transporters and that will, via the screen faces, proceed into the collector groove.

7. A weighing machine according to claim 6, characterised in that an outlet from the collector groove is configured in particular for liquids that are collected in the collector groove.

8. A weighing machine according to claim 1, characterised in that the screen faces constitute a part of the frame construction of the weighing machine, and wherein the central distributor, the transporters and/or the scales are mounted on the screen face by means of fittings intended therefor.

9. A weighing machine according to claim 8, characterised in that the fittings are configured such that they permit material that runs or slides down the screen face to run or slide past the fitting.

10. A weighing machine according to claim 9, characterised in that the fittings comprise substantially plane plate flanges that are attached to the screen face in such a manner that the plane of the plate flange extends substantially vertically or slantingly downwards.

11. A weighing machine according to claim 10, characterised in that the weighing machine comprises a computer ia for collecting weighing data from the scales and for controlling the transporters, and wherein at least a part of the weighing machine computer is located underneath the screen face.

12. A weighing machine according to claim 11, characterised in that a number of liquid nozzles are configured underneath the screen face, said nozzles being connected to a liquid conduit with a view to sweeping and cleaning the screen face with cleaning liquid.

13. A weighing machine according to claim 3, characterised in that the screen face extends substantially uninterrupted from a place underneath the central distributor and out below the other end of the grooves.

* * * * *